United States Patent
Yajima et al.

(10) Patent No.: US 8,866,777 B2
(45) Date of Patent: Oct. 21, 2014

(54) DEVICE, METHOD, AND STORAGE MEDIUM STORING PROGRAM

(71) Applicant: Kyocera Corporation, Kyoto (JP)

(72) Inventors: Takayuki Yajima, Yokohama (JP); Katsuaki Oonishi, Tokyo (JP)

(73) Assignee: Kyocera Corporation, Kyoto (JP)

( * ) Notice: Subject to any disclaimer, the term of this patent is extended or adjusted under 35 U.S.C. 154(b) by 97 days.

(21) Appl. No.: 13/628,283

(22) Filed: Sep. 27, 2012

(65) Prior Publication Data

US 2013/0082956 A1    Apr. 4, 2013

(30) Foreign Application Priority Data

Sep. 30, 2011    (JP) ................ 2011-218164

(51) Int. Cl.
| | | |
|---|---|---|
| *G06F 3/041* | (2006.01) | |
| *G06F 3/038* | (2013.01) | |
| *G06F 3/0488* | (2013.01) | |
| *H04M 1/57* | (2006.01) | |
| *H04M 1/2745* | (2006.01) | |
| *G06F 1/16* | (2006.01) | |

(52) U.S. Cl.
CPC .... *H04M 1/274533* (2013.01); *H04M 2250/22* (2013.01); *G06F 3/04883* (2013.01); *H04M 1/576* (2013.01); *G06F 1/1626* (2013.01)
USPC .......................................... 345/173; 345/212

(58) Field of Classification Search
USPC ................. 345/173, 178, 175, 211, 212
See application file for complete search history.

(56) References Cited

U.S. PATENT DOCUMENTS

2008/0165160 A1* 7/2008 Kocienda et al. ............. 345/175
2011/0304560 A1* 12/2011 Dale et al. .................... 345/173

FOREIGN PATENT DOCUMENTS

WO     2008086302 A1    7/2008

* cited by examiner

*Primary Examiner* — Michael Faragalla
(74) *Attorney, Agent, or Firm* — Lowe Hauptman & Ham, LLP

(57) ABSTRACT

According to an aspect, a device includes: a communication unit, a touch screen display, and a controller. The communication unit acquires information through communication service. The touch screen display displays a screen for setting an image in individual information registered in address book data. When a predetermined gesture is detected during display of the screen, the controller acquires an image to be associated with the individual information through communication service registered in the individual information.

6 Claims, 10 Drawing Sheets

FIG.6

| ID | FAMILY NAME | GIVEN NAME | IMAGE | SERVICE NAME | SERVICE ID | NOTIFI-CATIONS | LAST USE DATE/TIME |
|---|---|---|---|---|---|---|---|
| P001 | Sasaki | Ichiro | blank.png | Phone | 999-9999-9999 | 0 | 2011/5/4 18:38 |
| | | | | Email | xxxxx@example1.com | 0 | 2011/7/24 9:56 |
| | | | | F-SNS | yyyyy@example2.com | 3 | 2011/7/26 21:59 |
| | | | | M-SNS | zzzzz@example3.com | 1 | 2011/6/13 22:05 |
| P002 | Tanaka | Hanako | prof002.png | Phone | 999-9999-8888 | 1 | 2011/7/1 15:21 |
| | | | | Email | aaaaa@example4.com | 2 | 2011/7/26 19:33 |
| | | | | F-SNS | bbbbb@example5.com | 0 | 2011/7/3 19:15 |
| | | | | T-SNS | ccccc@example6.com | 5 | 2011/7/26 22:16 |
| | | | | D-SNS | ddddd@example7.com | 0 | 2011/2/4 21:26 |
| | | | | M-SNS | eeeee@example8.com | 0 | 2011/6/17 23:31 |
| P003 | Suzuki | Taro | prof003.png | Phone | 999-9999-7777 | 3 | 2011/7/25 15:38 |
| | | | | Email | nnnnn@example1.com | 0 | 2011/7/25 15:41 |
| ... | ... | ... | ... | ... | ... | ... | ... |

9X

| GROUP NUMBER | GROUP NAME | MEMBER NUMBER | ID |
|---|---|---|---|
| 1 | FRIENDS | 1 | P002 |
| | | 2 | P001 |
| | | ... | ... |
| 2 | BUSINESS | ... | ... |
| ... | ... | ... | ... |

DEVICE, METHOD, AND STORAGE MEDIUM STORING PROGRAM

CROSS-REFERENCE TO RELATED APPLICATIONS

This application claims priority from Japanese Application No. 2011-218164, filed on Sep. 30, 2011, the content of which is incorporated by reference herein in its entirety.

BACKGROUND

1. Technical Field

The present application relates to a device, a method, and a storage medium storing therein a program. More particularly, the present application relates to a device including a touch screen display, a method of controlling the device, and a storage medium storing therein a program for controlling the device.

2. Description of the Related Art

A touch screen device having a touch screen display has been known. Examples of the touch screen devices include, but are not limited to, a smartphone and a tablet. The touch screen device detects a gesture of a finger, a pen, or a stylus pen through the touch screen display. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

Some of touch screen devices have an application to register individual information. The application to register individual information includes, for example, an address book application. The touch screen device executes the address book application to register, for example, a name of a person, a phone number, an e-mail address, and an image as individual information. The touch screen device may display an image registered in the individual information as a profile image of a person on the touch screen display. If the profile image is registered, the touch screen device displays the profile image on the touch screen display. Meanwhile, if the profile image is not registered, the touch screen device displays a blank image indicating a blank state on the touch screen display.

For the foregoing reasons, there is a need for a device, a method, and a program that allow the user to easily register an image in the individual information.

SUMMARY

According to an aspect, a device includes: a touch screen display and a controller. The controller sets an image in individual information registered in address book data in an associated manner. When predetermined gesture for setting the image in the individual information is detected, the controller displays an image selection screen that includes an option to acquire the image to be associated with the individual information through communication service registered in the individual information.

According to another aspect, a non-transitory storage medium stores therein a program. When executed by a device including a touch screen display, the program causes the device to execute: detecting a predetermined gesture for setting an image in individual information registered in address book data in an associated manner; and displaying, upon the detecting, an image selection screen that includes options to acquire the image to be associated with the individual information through communication service registered in the individual information.

According to an aspect, a device includes: a communication unit, a touch screen display, and a controller. The communication unit acquires information through communication service. The touch screen display displays a screen for setting an image in individual information registered in address book data. When a predetermined gesture is detected during display of the screen, the controller acquires an image to be associated with the individual information through communication service registered in the individual information.

BRIEF DESCRIPTION OF THE DRAWINGS

FIG. 6 is a diagram illustrating an example of address book data;

DETAILED DESCRIPTION

Exemplary embodiments of the present invention will be explained in detail below with reference to the accompanying drawings. A smartphone will be explained below as an example of a device provided with a touch screen display.

Figure 1:
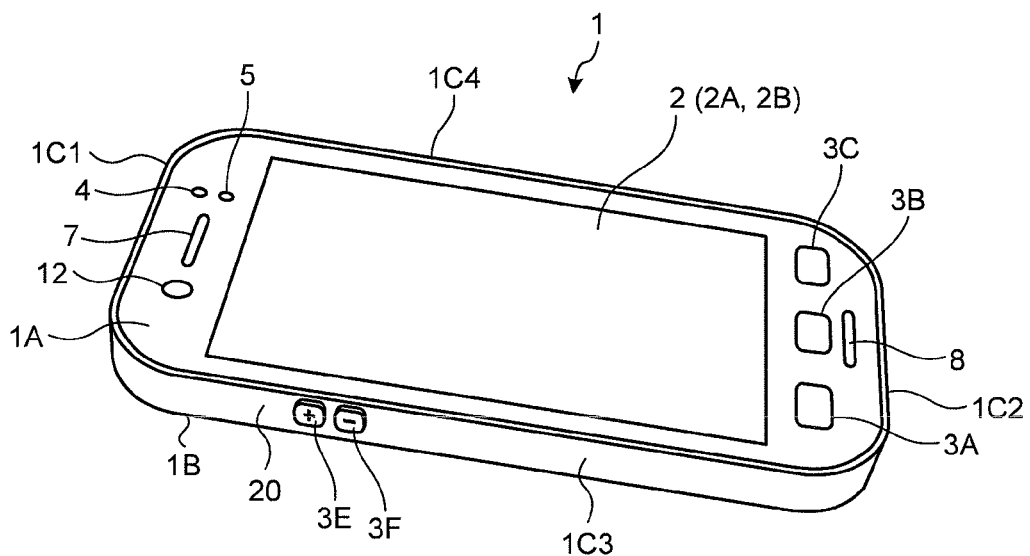
FIG. 1 is a perspective view of a smartphone according to an embodiment.
Figure 2:
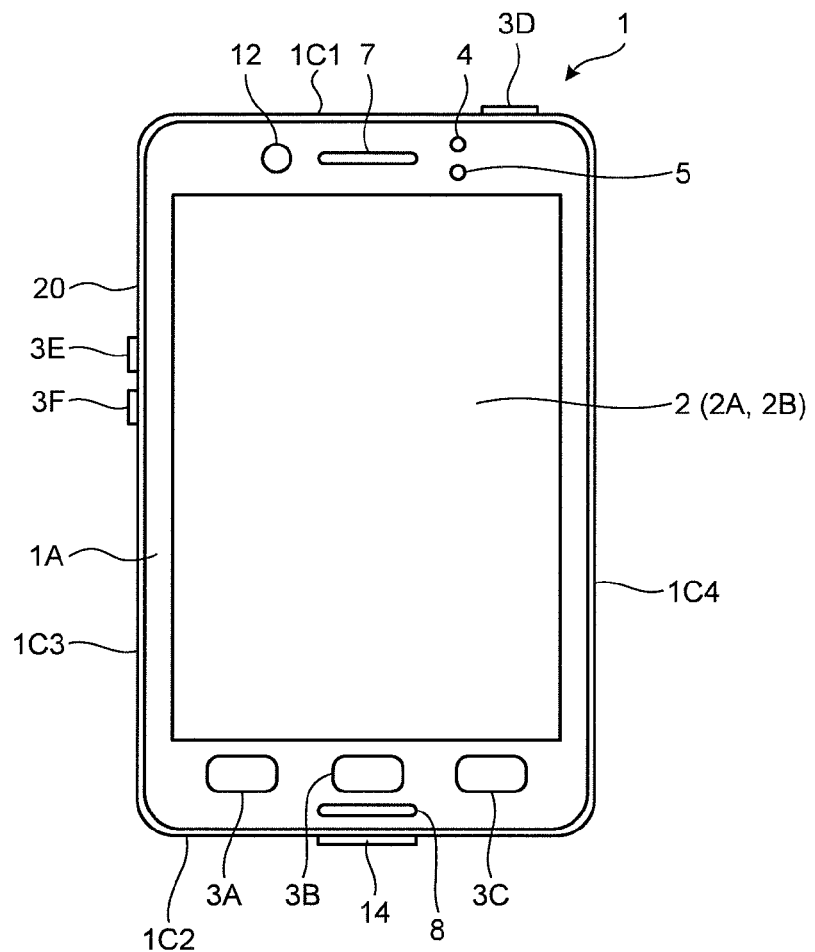
FIG. 2 is a front view of the smartphone.
Figure 3:
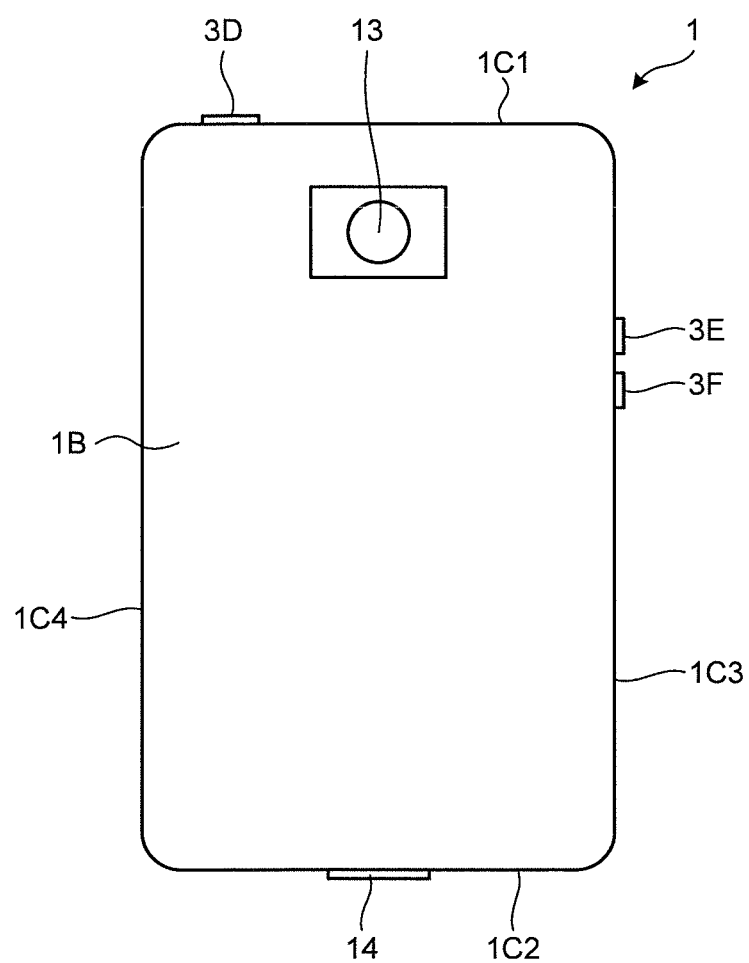
FIG. 3 is a back view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a camera 13, which is provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (OELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B. In the description herein below, a finger, pen, stylus pen, and the like may be referred to as a "contact object" or an "object".

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

In the description herein below, a gesture performed by using a finger may be referred to as a "single touch gesture", and a gesture performed by using a plurality of fingers may be referred to as a "multi touch gesture". Examples of the multi touch gesture include a pinch in and a pinch out. A tap, a flick, a swipe, and the like are a single touch gesture when performed by using a finger, and are a multi touch gesture when performed by using a plurality of fingers.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X" or "the controller detects X".

Figure 4:
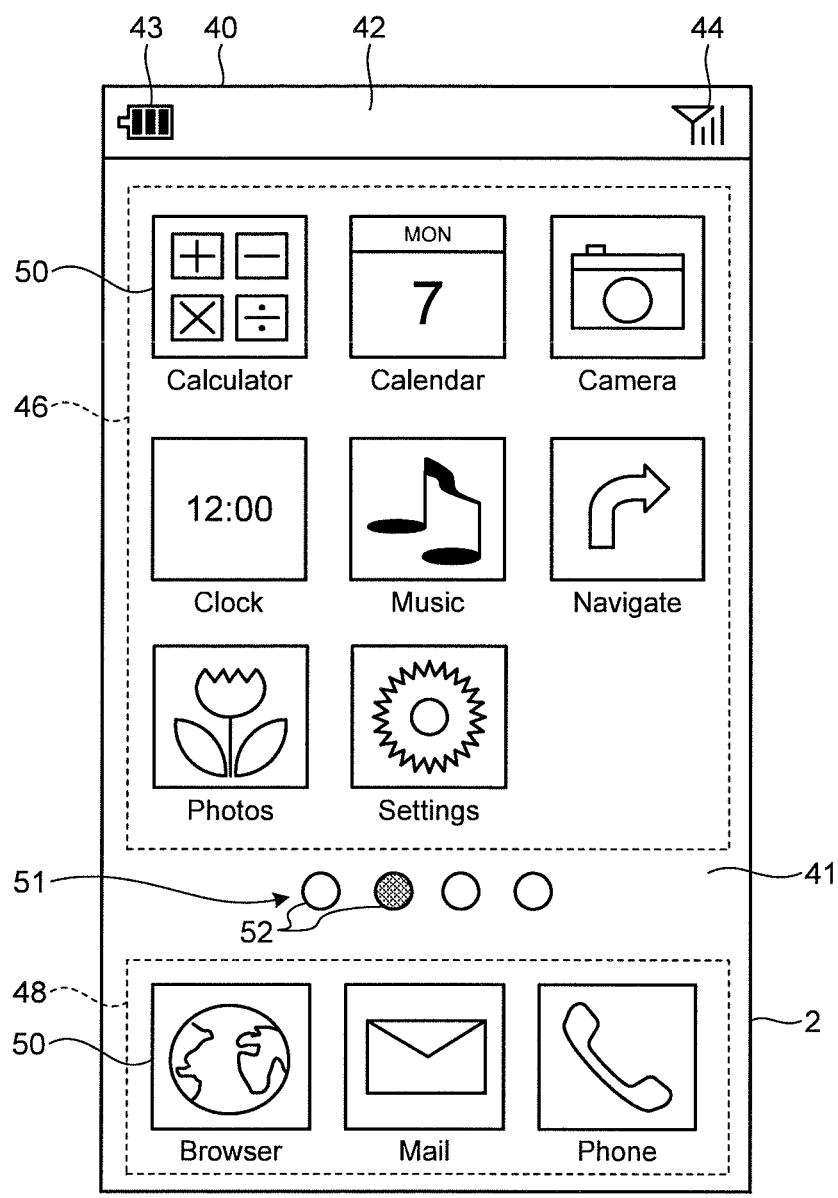
FIG. 4 is a diagram illustrating an example of a home screen.

An example of the screen displayed on the display 2A will be explained below with reference to FIGS. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application.

The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The home screen 40 illustrated in FIG. 4 includes a first area 46 and a second area 48, and the icons 50 are arranged in these two areas. In the home screen 40, eight icons 50 are arranged in the first area 46 and three icons 50 are arranged in the second area 48.

The first area 46 is an individual icon area where the icons 50 associated with the home screen 40 are displayed. When the home screen 40 to be displayed on the touch screen display 2 is changed, the smartphone 1 displays icons 50 associated with a changed home screen 40 in the first area 46. The second area 48 is a common icon area where icons 50 common to all the home screens 40 are displayed. In the smartphone 1, even when the home screen 40 to be displayed on the touch screen display 2 is changed, the icons 50 displayed in the second area 48 are not changed. That is, in the smartphone 1, even if the home screen 40 is changed, the same icons 50 are displayed in the second area 48.

The smartphone 1 can include a plurality of home screens. The smartphone 1 determines, for example, the number of home screens according to setting by the user. The smartphone 1 displays a selected one on the display 2A even if there is a plurality of home screens.

The smartphone 1 displays an indicator (a locator) 51 on the home screen. The indicator 51 includes one or more symbols. The number of the symbols is the same as that of the home screens. In the indicator 51, a symbol corresponding to a home screen that is currently displayed is displayed in a different manner from that of symbols corresponding to the other home screens.

The indicator 51 in an example illustrated in FIG. 4 includes four symbols 52. This means the number of home screens is four. According to the indicator 51 in the example illustrated in FIG. 4, the second symbol 52 from the left is displayed in a different manner from that of the other symbols 52. This means that the second home screen from the left is currently displayed.

The smartphone 1 can change a home screen to be displayed on the display 2A. When a gesture is detected while displaying one of home screens, the smartphone 1 changes the home screen to be displayed on the display 2A to another one. For example, when detecting a rightward flick, the smartphone 1 changes the home screen to be displayed on the display 2A to a home screen on the left side. For example, when detecting a leftward flick, the smartphone 1 changes the home screen to be displayed on the display 2A to a home screen on the right side. The smartphone 1 changes the home screen to be displayed on the display 2A from a first home screen to a second home screen, when a gesture is detected while displaying the first home screen, such that the area of the first home screen displayed on the display 2A gradually becomes smaller and the area of the second home screen displayed gradually becomes larger. The smartphone 1 may switch the home screens such that the first home screen is instantly replaced by the second home screen.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation.

Figure 5:
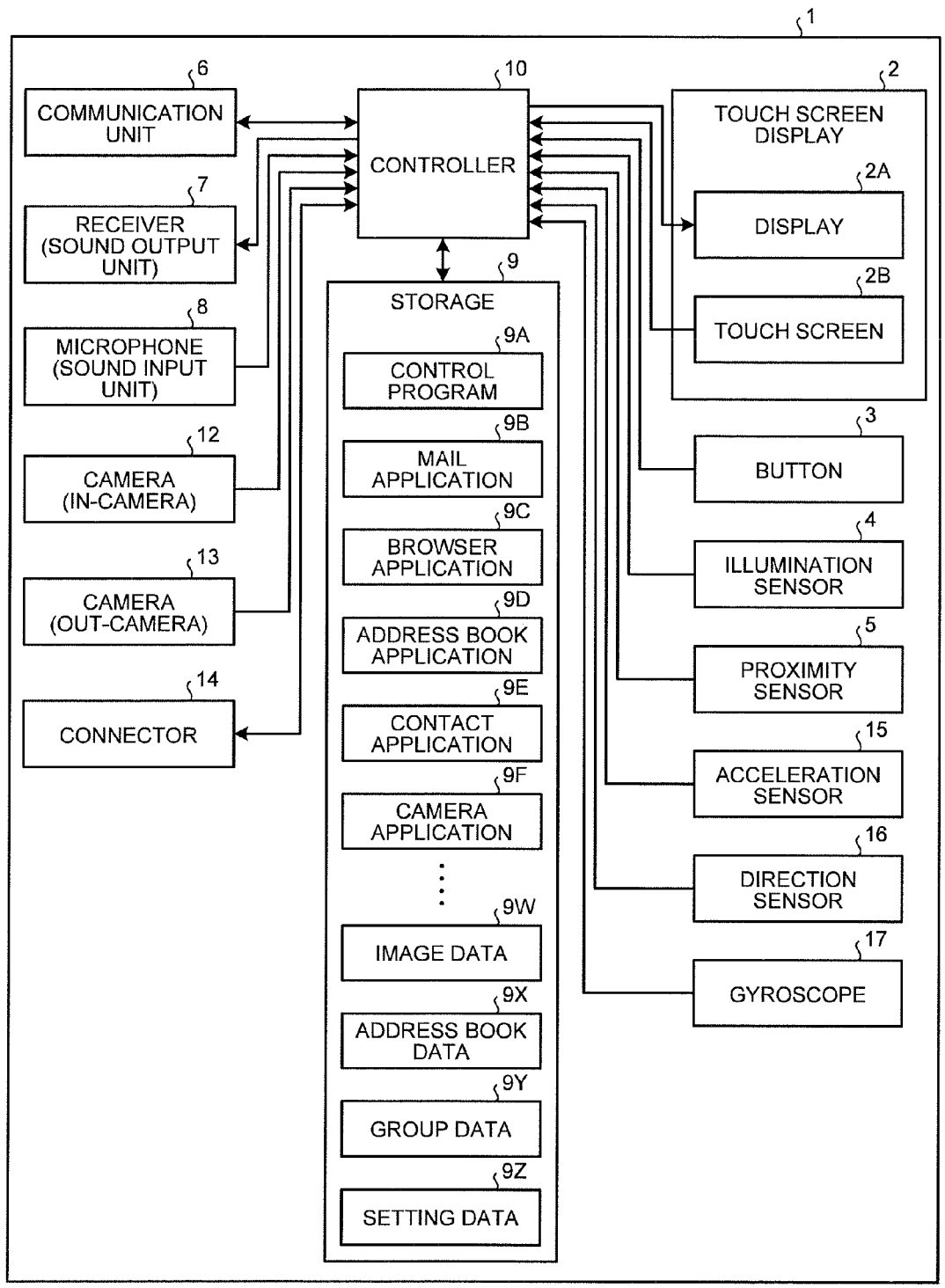
FIG. 5 is a block diagram of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects a gesture performed for the smartphone 1. Specifically, the controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects that, for example, the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 is a sound output unit. The receiver 7 outputs a sound signal transmitted from the controller 10 as sound. The receiver 7 is used, for example, to output voice of the other party on the phone. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2A and perform a process according to a gesture detected through the touch screen 2B. The control program is, for example, an OS. The applications and the control program may be installed in the storage 9 through communication by the communication unit 6 or through a non-transitory storage medium.

The storage 9 stores therein, for example, a control program 9A, a mail application 9B, a browser application 9C, an address book application 9D, a contact application 9E, a camera application 9F, image data 9W, address book data 9X, group data 9Y, and setting data 9Z. The mail application 9B provides an e-mail function for composing, transmitting, receiving, and displaying e-mail, and the like. The browser application 9C provides a WEB browsing function for displaying WEB pages. The camera application 9F provides a function for capturing a target object by an in-camera 12 or an out-camera 13. The image data 9W includes information for images stored in the storage 9. The setting data 9Z includes information related to various settings on the operations of the smartphone 1.

The address book application 9D provides a function for managing individual information stored in the address book data 9X, that is, provides functions related to, for example, registration, edit, deletion, and display of individual information. The address book application 9D also provides a function for displaying a screen to register individual information on the touch screen display 2.

The contact application 9E provides a function for displaying a contact widget on the home screen 40 based on the individual information stored in the address book data 9X. The contact widget is a screen that is arranged on the home screen 40 similarly to the icons 50. Contents to be displayed on the contact widget are updated periodically or according to a user's operation.

The address book data 9X holds individual information. The address book data 9X holds, for example, a name of a person (a family name and a given name), a phone number, an e-mail address, an image, and account information used when a person posts various messages in a communication site such as Social Network Service (SNS), as the individual information.

An example of the address book data 9X will be explained below with reference to FIG. 6. The address book data 9X illustrated in FIG. 6 has items including ID, Family name, Given name, Image, Service name, Service ID, Notifications, and Last use date/time. The address book data 9X is configured to hold one individual information associated with one ID. The address book data 9X is also configured to hold a plurality of combinations of Service name, Service ID, Notifications, and Last use date/time associated with one ID.

The item of ID holds identification numbers for identifying persons in the address book data 9X. The item of Family name holds family names of persons. The item of Given name holds given names of persons. The item of Image holds information in which a person is associated with an image included in the image data 9W. The image includes, for example, a profile image registered in a person's name. The image also includes a blank image indicating a blank state which is displayed, for example, when a profile image is not registered for a person. Examples of the profile image include, but are not limited to, a person's face image, an image such as an illustration, and a landscape image.

The item of Service name holds information related to types of communication services used by each person. Set in the item of Service name are, for example, "Phone" indicating phone service, "Email" indicating e-mail service, and "F-SNS", "T-SNS", "D-SNS", and "M-SNS" indicating SNS run by different companies. The item of Service ID holds a phone number or account information of a person associated with communication service. Set in the item of Service ID are, for example, a phone number associated with phone service, an e-mail address associated with e-mail service, and account information associated with any of SNSs.

The item of Notifications holds the number of events to be notified to the user of the smartphone 1 among events performed by a corresponding person in corresponding communication service. For example, when the corresponding communication service is the phone service, the number of phone calls that have been transmitted from a corresponding person to the user of the smartphone 1 but cannot be responded by the user is set in the item of Notifications. When the corresponding communication service is the e-mail service, the number of unopened e-mails having been transmitted from a corresponding person to the user of the smartphone 1 is set in the item of Notifications.

When the corresponding communication service is SNS, the number of messages that have been posted by a corresponding person but are not read by the user of the smartphone 1 is set in the item of Notifications. The message mentioned here may include a message targeted to unspecified persons, a message targeted to a group the user belongs to, and a message addressed to the user.

The item of Last use date/time holds the date and time when the last event related to the user of the smartphone 1 is performed among events performed by a corresponding person in the corresponding communication service. For example, when the corresponding communication service is the phone service, the date and time of the last outgoing call transmitted from a corresponding person to the user of the smartphone 1 is set in the item of Last use date/time. When the corresponding communication service is the e-mail service, the date and time of the last outgoing mail transmitted from a corresponding person to the user of the smartphone 1 is set in the item of Last use date/time.

When the corresponding communication service is SNS, the date and time of the last posted message that the corresponding person has posted is set in the item of Last use date/time. The message mentioned here may include a message targeted to unspecified persons, a message targeted to a group the user belongs to, and a message addressed to the user.

The address book data 9X may include various pieces of personal information such as an address, a place of work, and a date of birth in addition to the above information. The address book data 9X may hold a plurality of pieces of information related to the same type of communication service associated with one person such as his/her home phone number, work phone number, and mobile phone number.

The group data 9Y holds information related to grouping of persons registered in the address book data 9X. An example of the group data 9Y will be explained with reference to FIG. 7. The group data 9Y illustrated in FIG. 7 has items including Group number, Group name, Member number, and ID. The group data 9Y is configured to hold a plurality of combinations of Member number and ID associated with one Group number.

The item of Group number holds identification numbers for identifying groups. The item of Group name holds names of groups. The item of Member number holds numbers indicating the display order of members included in a group. The item of ID holds identification numbers of members in the address book data 9X. A value of the item of ID in the group data 9Y corresponds to a value of the item of ID in the address book data 9X.

The control program 9A provides a function related to various controls for operating the smartphone 1. The control program 9A controls, for example, the communication unit 6, the receiver 7, and the microphone 8 to make a phone call. The function provided by the control program 9A includes functions for performing various controls such as changing of information related to a person displayed on the display 2A according to a gesture detected through the touch screen 2B. The functions provided by the control program 9A can be used in combination with a function provided by the other program such as the address book application 9D.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, and the receiver 7. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes, for example, the control program 9A to display the home screen 40 on the display 2A. The controller 10 also executes, for example, the address book application 9D to display a screen for registering individual information on the display 2A. Furthermore, the controller 10 executes the contact application 9E to display a contact widget on the home screen 40.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 5 may be downloaded from any other device through communication by the communication unit 6. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

Functions provided by the contact application 9E will be explained with reference to FIG. 8. The functions provided by the contact application 9E include a function for displaying a contact widget on the home screen 40 and a function for updating the contact widget.

Figures 7, 8:
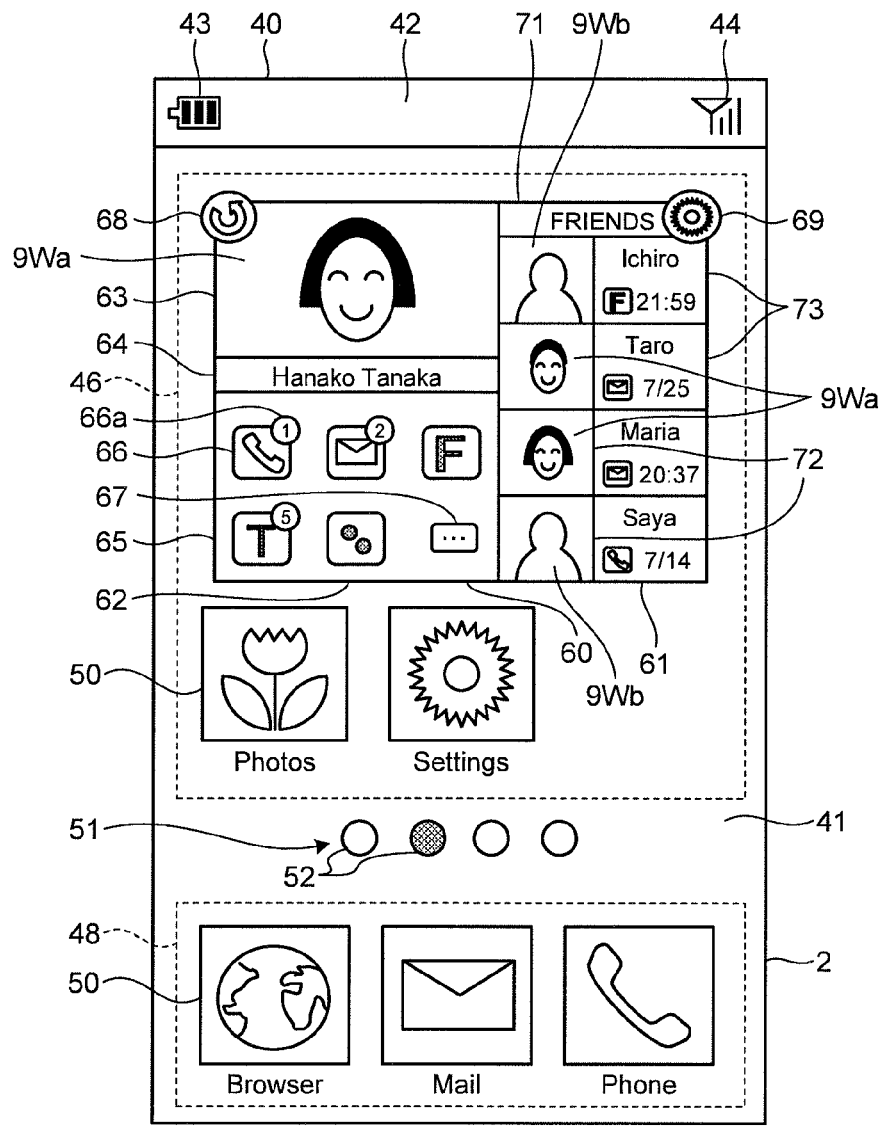
FIG. 7 is a diagram illustrating an example of group data.
FIG. 8 is a diagram illustrating an example of a contact widget.

FIG. 8 is a diagram illustrating an example of a contact widget. As illustrated in FIG. 8, a contact widget 60 displays information related to a person as individual information included in the address book data 9X. The information displayed on the contact widget 60 includes information related to communication services associated with the person in the address book data 9X.

The contact widget 60 is arranged in the first area 46 of the home screen 40, similarly to the icons 50 arranged in the first area 46. When the contact widget 60 arranged in the first area 46 and the icons 50 arranged in the first area 46 are superimposed on each other, the smartphone 1 preferentially displays the contact widget 60. That is, when it is determined that the area where the contact widget 60 is displayed and the area where the icons 50 are displayed are superimposed on each other based on position information for the area where the contact widget 60 is displayed and position information for the area where the icons 50 are displayed, the smartphone 1 displays the contact widget 60 instead of displaying the icons 50 which are superimposed thereon.

When the power for the smartphone 1 is turned on and the home screen 40 appears on the display 2A, similarly to the icons 50, the contact widget 60 is displayed as part of the home screen 40 without any particular operation performed by the user. When an application executed through a tap on an icon 50 is ended and the home screen 40 again appears on the display 2A, similarly to the icons 50, the contact widget 60 is displayed as part of the home screen 40 without any particular operation performed by the user.

The contact widget 60 includes a member list area 61, a detailed information area 62, an update icon 68, and an edit icon 69. The member list area 61 displays information related to one of groups registered in the group data 9Y. Specifically, the member list area 61 includes a group name area 71, an image area 72, and a personal name area 73. The group name area 71 is an area displaying a name of a group. The image area 72 is an area displaying an image registered in the address book data 9X in association with a person included in the group. When a profile image 9Wa is associated with a person, the profile image 9Wa is displayed in the image area 72. When a blank image 9Wb is associated with a person, the blank image 9Wb is displayed in the image area 72. The blank image 9Wb is, for example, an image of a human figure. The personal name area 73 is an area displaying the name of a person included in a group and the date or the time of last used communication service. The information included in the member list area 61 is obtained from the address book data 9X.

The detailed information area 62 displays detailed information related to one person selected from among persons included in the address book data 9X. The detailed information area 62 includes an image area 63, a name area 64, and an icon area 65. The image area 63 is an area the same as the image area 72 of the member list area 61 and displaying an image registered in the address book data 9X in association with the selected person. The name area 64 is an area displaying the name of the selected person. The image and the name of the selected person are obtained from the address book data 9X.

The icon area 65 is an area where icons 66 indicating communication services registered in the address book data 9X in association with the selected person are arranged. Each of the icons 66 is displayed using an image previously associated with a corresponding communication service. When a value of the number of notifications set in the address book data 9X in association with the communication service corresponding to the icon 66 is greater than 0, the icon 66 is added with a numerical icon 66a indicating the value of the number of notifications.

When the number of communication services registered in the address book data 9X in association with the selected person is larger than the number of icons 66 that can be displayed in the icon area 65, a page change icon 67 is displayed in the icon area 65 as illustrated in FIG. 8. The page change icon 67 indicates the user that there are icons 66 that cannot be displayed in the icon area 65. When a tap on the page change icon 67 is detected, the smartphone 1 displays remaining icons 66 that could not be displayed in the icon area 65 therein.

The communication services registered in the address book data 9X in association with a selected person may be displayed in a form of list using a character string such as a name instead of an icon. Instead of displaying the number of notifications, a mode in which corresponding service is displayed may be changed according to whether the number of notifications is 0.

When a tap on the update icon 68 is detected, the smartphone 1 updates information displayed in the detailed information area 62 to the latest information related to the selected person. For example, when the number of unopened e-mails received from the selected person is increased from 2 to 3, the smartphone 1 changes the numerical icon 66a to be added to the icon 66 corresponding to the e-mail service from the numerical icon 66a with "2" to that with "3". The smartphone 1 periodically updates the numerical icon 66a added to each icon 66 according to the latest situation even if the tap on the update icon 68 is not detected.

When detecting a tap on the edit icon 69, the smartphone 1 executes a process for managing information related to persons displayed in the contact widget 60. That is, the smartphone 1 executes the address book application 9D as the process for managing information related to the persons. The process for managing information related to persons will be explained in detail later.

In this way, the contact widget 60 includes the icon 66 corresponding to the communication service registered in the address book data 9X in association with the selected person. Therefore, the user looks at the contact widget 60 and can thereby easily recognize which of the communication services the selected person uses.

Then, a function provided by the address book application 9D will be explained below with reference to FIG. 9 to FIG. 11. The function provided by the address book application 9D includes a function for displaying a screen for managing information related to persons as individual information. Examples of screens for managing information related to persons include, but are not limited to, a person list screen and a registration screen. The person list screen displays a list of persons registered in the address book data 9X. The registration screen displays information related to a certain person which is individual information registered in the address book data 9X. The function provided by the address book application 9D also includes functions for registering, editing, deleting, and displaying information related to a certain person on the registration screen.

The address book application 9D is executed by the user performing a predetermined gesture for executing the address book application 9D on the touch screen 2B. For example, as the predetermined gesture, the user taps the edit icon 69 of the contact widget 60 displayed on the home screen 40 to execute the address book application 9D from the contact widget 60.

Namely, when detecting a tap on the edit icon 69 of the contact widget 60, the smartphone 1 executes the address book application 9D.

The predetermined gesture of executing the address book application 9D is not limited thereto. The user may perform a gesture, for example, for displaying the icon 50 associated with the address book application 9D on the touch screen display 2. Thereafter, the user may execute the address book application 9D by tapping the icon 50 associated with the address book application 9D. As the predetermined gesture, when detecting a tap on the icon 50 associated with the address book application 9D, the smartphone 1 may execute the address book application 9D.

A case in which the user taps the edit icon 69 of the contact widget 60 to execute the address book application 9D will be explained below. At Step S11 in FIG. 9, the user taps the edit icon 69 of the contact widget 60 displayed on the home screen 40. When detecting the tap on the edit icon 69 of the contact widget 60, the smartphone 1 executes the address book application 9D. As illustrated at Step S12 in FIG. 9, when the address book application 9D is executed, the smartphone 1 displays a person list screen 80 on the display 2A. The person list screen 80 displays a list of persons registered in the address book data 9X.

The person list screen 80 displays the list of persons in which, for example, the names of the persons registered in the address book data 9X are arranged in alphabetical order or in Japanese alphabetical order. Further, the person list screen 80 displays the list of the persons registered in the address book data 9X associated with, for example, groups of the group data 9Y.

Figure 9:
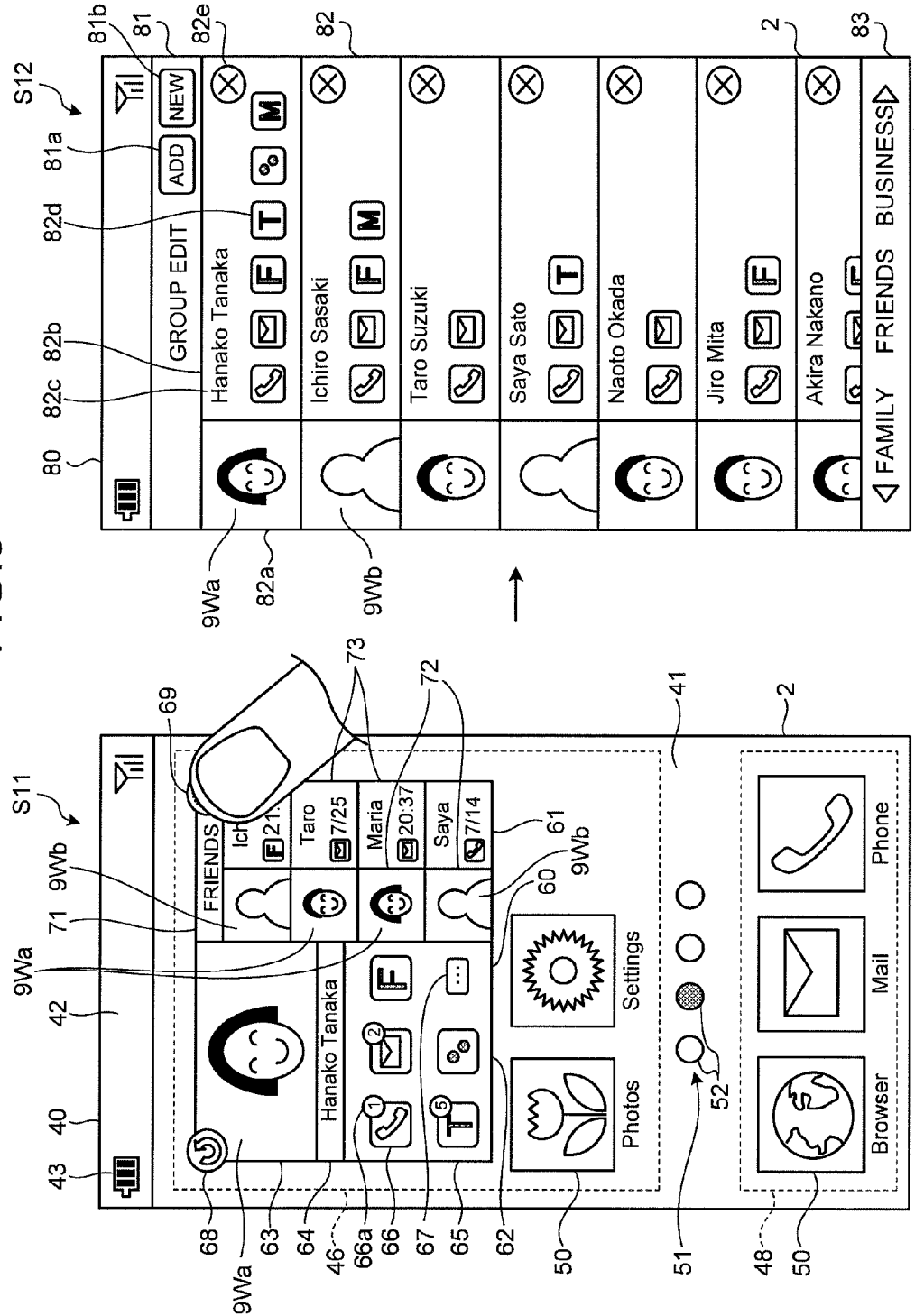
FIG. 9 is a diagram illustrating an example of an operation for displaying a person list screen.

Step S12 in FIG. 9 depicts an example of the person list screen 80. The user taps the edit icon 69 of the contact widget 60 to enable edit of a person displayed in the member list area 61 of the contact widget 60. Therefore, when detecting a tap on the edit icon 69 of the contact widget 60, the smartphone 1 displays the list of the persons in the member list area 61 of the contact widget 60 on the person list screen 80.

The person list screen 80 includes a header 81, a person list area 82, and a footer 83. The header 81 includes a name of the person list screen 80, an Add button 81*a*, and a New button 81*b*. The name of the person list screen 80 is, for example, "Group Edit". The Add button 81*a* is used to newly add a certain person included in the address book data 9X to a certain group. The New button 81*b* is used to newly register a person in the address book data 9X.

When detecting a tap on the Add button 81*a*, the smartphone 1 displays a screen to select a certain person included in the address book data 9X on the display 2A. When a person is selected on the screen, the smartphone 1 updates the group data 9Y so that the selected person is included in the group displayed in the person list screen 80. However, one person is prohibited from belonging to the same group in a duplicated manner.

When detecting a tap on the New button 81*b*, the smartphone 1 displays a registration screen for registering a new person on the display 2A. When information related to a new person is input in the registration screen, the smartphone 1 stores the information related to the new person in the address book data 9X.

The person list area 82 displays an image area 82*a* and an information display area 82*b* indicating predetermined information for a person for each person belonging to a group. The image area 82*a* is similar to the image area 72 of the member list area 61 and displays an image registered in the address book data 9X associated with a person. The information display area 82*b* displays a name 82*c*, icons 82*d* indicating communication services registered in the address book data 9X associated with a person, and a delete icon 82*e*. When detecting a tap on the delete icon 82*e*, the smartphone 1 updates the group data 9Y so that the person corresponding to the tapped delete icon 82*e* is not included in the group displayed on the person list screen 80. Moreover, the smartphone 1 deletes the person corresponding to the tapped delete icon 82*e* from the person list area 82.

The footer 83 displays a group name currently displayed, a group name displayed when a rightward flick is detected, and a group name displayed when a leftward flick is detected.

When detecting a flick gesture or a swipe gesture in the vertical direction in the person list area 82, the smartphone 1 scrolls the list of persons displayed in the person list area 82 according to the direction of the detected gesture. When the predetermined gesture is detected, the smartphone may change the order of the members displayed in the person list area 82 and reflect the change of the order in the group data 9Y.

Figure 10:
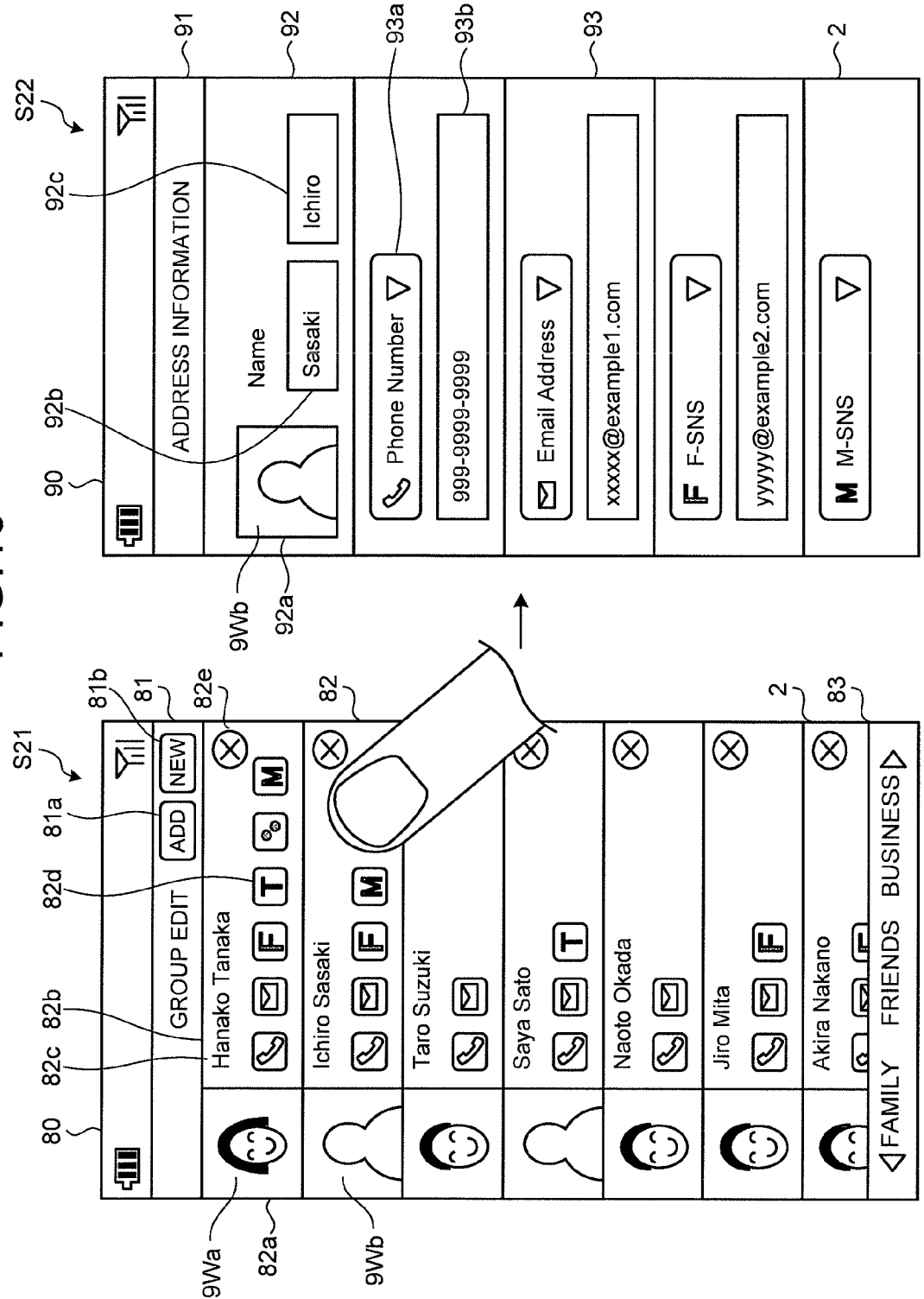
FIG. 10 is a diagram illustrating an example of an operation for displaying a registration screen.

At Step S21 in FIG. 10, the user is tapping the information display area 82*b* in the person list area 82 on the person list screen 80. When detecting the tap on the information display area 82*b*, as illustrated at Step S22 in FIG. 10, the smartphone 1 displays a registration screen 90 on the display 2A. The registration screen 90 displays information related to a certain person registered in the address book data 9X.

Step S22 in FIG. 10 depicts an example of the registration screen 90. The user taps the image area 82*a* or the information display area 82*b* of the person list screen 80 to register information related to a certain person. The smartphone 1 detects a tap on the image area 82*a* or the information display area 82*b*, and displays the registration screen 90 for registering the information related to the certain person on the display 2A.

The registration screen 90 includes a header 91, a profile area 92, and a service list area 93. The header 91 displays, for example, "Address Information" as the name of the registration screen 90.

The profile area 92 includes an image area 92*a*, a family-name input item 92*b* of the certain person, and a given-name input item 92*c* of the certain person. The family-name input item 92*b* is a field for inputting the person's family name. The given-name input item 92*c* is the field for inputting the person's given name.

The image area 92*a* is similar to the image area 72 of the member list area 61, and displays an image registered in the address book data 9X associated with the person displayed on the registration screen 90. At Step S22, because the blank image 9Wb is associated with the person, the blank image 9Wb is displayed in the image area 92*a*. When detecting a tap on the image area 92*a*, the smartphone 1 displays an image selection screen for selecting an image to be displayed in the image area 92*a* on the registration screen 90.

The service list area 93 displays a service selection item 93*a* and a service-ID input item 93*b* for each service. The service selection item 93*a* is an item for selecting communication service used by the person from previously registered communication services. The service selection item 93*a* includes, but is not limited to, "Phone Number", "Email Address", "F-SNS", "T-SNS", "D-SNS", and "M-SNS". The service-ID input item 93*b* is a field for inputting the person's Account ID in a communication service selected in the corresponding service selection item 93*a*. Namely, when the service selection item 93*a* is "Phone Number", the phone number is input in the service-ID input item 93*b*. When the service selection item 93*a* is "Email Address", the email address is input in the service-ID input item 93*b*. Furthermore, the service selection item 93*a* is any of the SNSs, account information for the SNS is input in the service-ID input item 93b. The total number of services included in the list displayed in the service list area 93 is increased or decreased according to a user's operation.

The smartphone 1 stores the information input in the registration screen 90, as information related to the certain person, in the address book data 9X. That is, the smartphone 1 changes the address book data 9X to address book data 9X in which the person displayed on the registration screen 90 is associated with the information input in the registration screen 90, and stores the changed address book data 9X in the storage 9.

The smartphone 1 detects a tap on the image area 82a or on the information display area 82b in the person list screen 80, and thereby displays the registration screen 90 on the display 2A. However, the smartphone 1 detects a tap on the New button 81b, and may thereby display the registration screen 90 on the display 2A. In this case, the registration screen 90 is changed to a screen for registering information related to a new person. That is, the registration screen 90 has the input items all of which are blank, and the image area 92a displays the blank image 9Wb.

Figure 11:
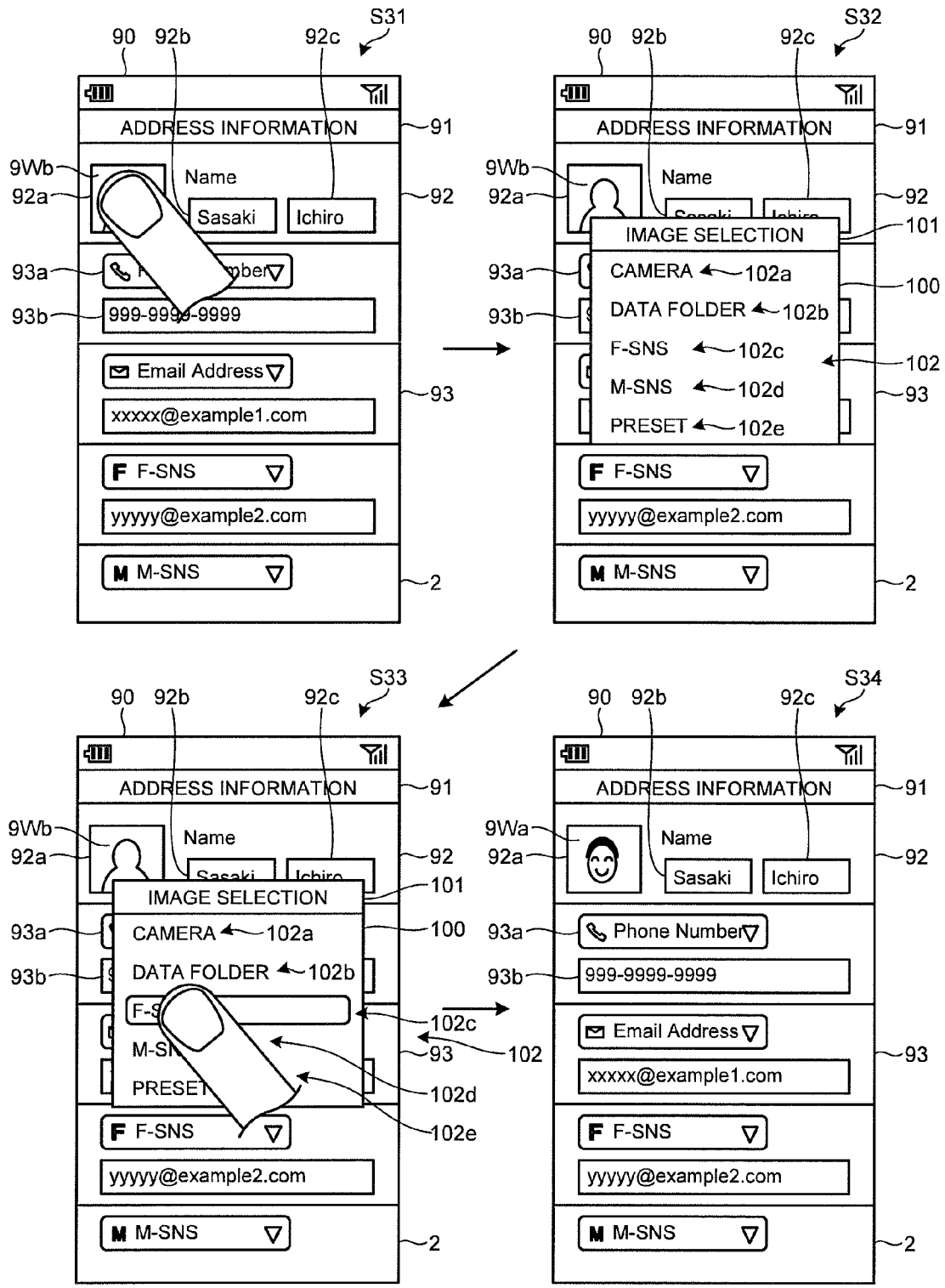
FIG. 11 is a diagram illustrating an example of an operation performed during the display of an image selection screen.

At Step S31 in FIG. 11, the smartphone 1 displays the registration screen 90 in which the blank image 9Wb is displayed in the image area 92a. The user taps the image area 92a of the registration screen 90. When detecting the tap on the image area 92a, as illustrated at Step S32, the smartphone 1 displays an image selection screen 100 on the registration screen 90.

Step S32 in FIG. 11 depicts an example of the image selection screen 100. The image selection screen 100 is a screen for selecting an image associated with the person. The image selection screen 100 includes a header 101 and a plurality of options 102. The header 101 displays "Image Selection", for example, as a name of the image selection screen 100.

The options 102 include a function for acquiring an image associated with the person displayed on the registration screen 90. Examples of the options 102 include, but are not limited to, an option 102a of "Camera", an option 102b of "Data folder", an option 102c of "F-SNS", an option of "T-SNS", an option of "D-SNS", an option 102d of "M-SNS", and an option 102e of "Preset". Of the options 102, the option 102a of "Camera", the option 102b of "Data folder", and the option 102e of "Preset" are always displayed on the image selection screen 100. Of the options 102, the options 102 of the SNSs are displayed when the account information for the SNSs is included in the address book data 9X for the person displayed on the registration screen 90. In the present embodiment, the option 102c of "F-SNS" and the option 102d of "M-SNS" are displayed on the image selection screen 100. When the image selection screen 100 is to be displayed, the smartphone 1 acquires the account information for the SNSs associated with the person from the address book data 9X. The smartphone 1 then displays the option 102a of "Camera", the option 102b of "Data folder", and the option 102e of "Preset" as options. Further, the smartphone 1 displays the options 102 of the SNSs associated with the person from the acquired account information for the SNSs associated with the person.

The user may tap the option 102a of "Camera" during the display of the image selection screen 100. When detecting the tap on the option 102a of "Camera", the smartphone 1 executes the camera application 9F. When the camera application 9F is executed, the smartphone 1 can capture a target object using the in-camera 12 or the out-camera 13. The user performs a gesture of capturing a target object on the touch screen 2B. When detecting the gesture of capturing the target object, the smartphone 1 acquires the image captured by the in-camera 12 or the out-camera 13 as the image data 9W. The user performs a gesture of storing the acquired image data 9W on the touch screen 2B. When detecting the gesture of storing the acquired image data 9W, the smartphone 1 stores the captured image in the storage 9 as the image data 9W. Then, the smartphone 1 registers the captured image as the profile image 9Wa of the person. That is, the smartphone 1 changes the address book data 9X to address book data 9X in which the captured image is associated with the person.

The user may tap the option 102b of "Data folder" during the display of the image selection screen 100. When detecting the tap on the option 102b of "Data folder", the smartphone 1 loads the image data stored in the storage 9, and displays images on the display 2A. The user performs a gesture of selecting a certain image from the displayed images. When detecting the gesture of selecting a certain image, the smartphone 1 registers the selected image as the profile image 9Wa of the person. That is, the smartphone 1 changes the address book data 9X to address book data 9X in which the selected image is associated with the person.

The user may tap the option 102 of any of the SNSs during the display of the image selection screen 100. When detecting the tap on the option 102 of the SNS, the smartphone 1 makes a communication with the communication service of the SNS to acquire an image associated with the account information based on the account information registered in the address book data 9X. The smartphone 1 then registers the acquired image as the profile image 9Wa of the person. That is, the smartphone 1 changes the address book data 9X to address book data 9X in which the acquired image is associated with the person. When an image associated with the account information cannot be acquired, the smartphone 1 re-displays the image selection screen 100.

The user may tap the option 102e of "Preset" during the display of the image selection screen 100. When detecting the tap on the option 102e of "Preset", the smartphone 1 deletes the profile image 9Wa registered in association with the person. In other words, when detecting the tap on the option 102e of "Preset", the smartphone 1 changes the profile image 9Wa associated with the person to the blank image 9Wb. That is, the smartphone 1 changes the address book data 9X to address book data 9X in which the blank image 9Wb is associated with the person.

At Step S33 in FIG. 11, the user taps the option 102c of "F-SNS" during the display of the image selection screen 100. When detecting the tap on the option 102c of "F-SNS", the smartphone 1 makes a communication with the communication service of "F-SNS" to acquire an image associated with the account information based on the account information registered in the address book data 9X. The smartphone 1 then registers the acquired image as the profile image 9Wa of the person.

The smartphone 1 changes the item of the image in the address book data 9X, and ends the display of the image selection screen 100. The smartphone 1 displays the registration screen 90 on the display 2A based on the changed address book data 9X. Thus, at Step S34 in FIG. 11, the smartphone 1 displays the profile image 9Wa in the image area 92a on the registration screen 90.

When the item of the image in the address book data 9X is changed, the smartphone 1 changes an image displayed in the image area 72 of the member list area 61, an image displayed in the image area 63 of the detailed information area 62, and an image displayed in the image area 82a of the person list area 82 in the contact widget 60.

As explained above, when detecting the tap on the option 102 of any of the SNSs during the display of the image selection screen 100, the smartphone 1 makes a communication with the communication service of the SNS to acquire an image associated with the account information based on the account information registered in the address book data 9X. Thus, the user taps the option 102 of any of the SNSs, so that the profile image 9Wa of a person can be automatically registered. Accordingly, the user can easily register the profile image 9Wa for a person whose profile image 9Wa is not registered.

When detecting the tap on the image area 92a during the display of the registration screen 90, the smartphone 1 displays the image selection screen 100. Thus, the user taps the option 102 displayed on the image selection screen 100, so that the profile image 9Wa of a person can be easily registered. That is, the user can easily register the profile image 9Wa for a person whose profile image 9Wa is not registered. Accordingly, if the profile image 9Wa of any person is registered, the smartphone 1 can display the profile image 9Wa of the person in the image area 72 of the member list area 61 and the image area 63 of the detailed information area 62 in the contact widget 60. Therefore, the user visually recognizes the profile image 9Wa displayed in the contact widget 60, thus improving also the operability of the contact widget 60.

When the profile image 9Wa of a person is registered, the smartphone 1 can display the profile image 9Wa in the image area 72 of the member list area 61, the image area 63 of the detailed information area 62, the image area 82a of the person list area 82, and the image area 92a of the registration screen 90. When the profile image 9Wa of a person is not registered, the smartphone 1 can display the blank image 9Wb in the image area 72 of the member list area 61, the image area 63 of the detailed information area 62, the image area 82a of the person list area 82, and the image area 92a of the registration screen 90. Thus, the user can easily determine whether or not the profile image 9Wa is registered in the person. Accordingly, the smartphone 1 can prompt the user to register the profile image 9Wa of the person.

In the present embodiment, the user taps the edit icon 69 of the contact widget 60 to thereby execute the address book application 9D; however, the present invention is not limited thereto. The user may execute the address book application 9D by tapping the icon 50 associated with the address book application 9D.

The smartphone 1 detects the tap on a predetermined area to thereby execute the address book application 9D. However, when detecting any gesture other than the tap, the smartphone 1 may execute the address book application 9D.

The smartphone 1 detects the tap on the option 102 of any of SNSs of the image selection screen 100 to thereby acquire an image through the communication service of the SNS. However, when there are a plurality of acquired images, the smartphone 1 may display an acquired-image selection screen. In other words, the user selects a certain image on the acquired-image selection screen, so that the selected image may be registered as the profile image 9Wa of the person.

When an image cannot be acquired through the communication service of any of the SNSs during the display of the image selection screen 100, the smartphone 1 re-displays the image selection screen 100. However, the smartphone 1 may display a screen for notifying that there is no acquired image before the image selection screen 100 is re-displayed.

The smartphone 1 may perform the process by detecting any operation other than the gesture performed on the touch screen display 2. For example, the smartphone 1 may perform the process by detecting an operation detected through the button 3, an operation of shaking the smartphone 1 detected through the acceleration sensor 15 or so, or a voice-based operation. The voice-based operation may be implemented, for example, by the controller 10 executing a voice recognition process to a voice signal transmitted from the microphone 8. The voice-based operation may also be implemented based on a result of the voice recognition process performed by other device that receives a sound signal transmitted from the microphone 8 through the communication unit 6.

Figure 12:
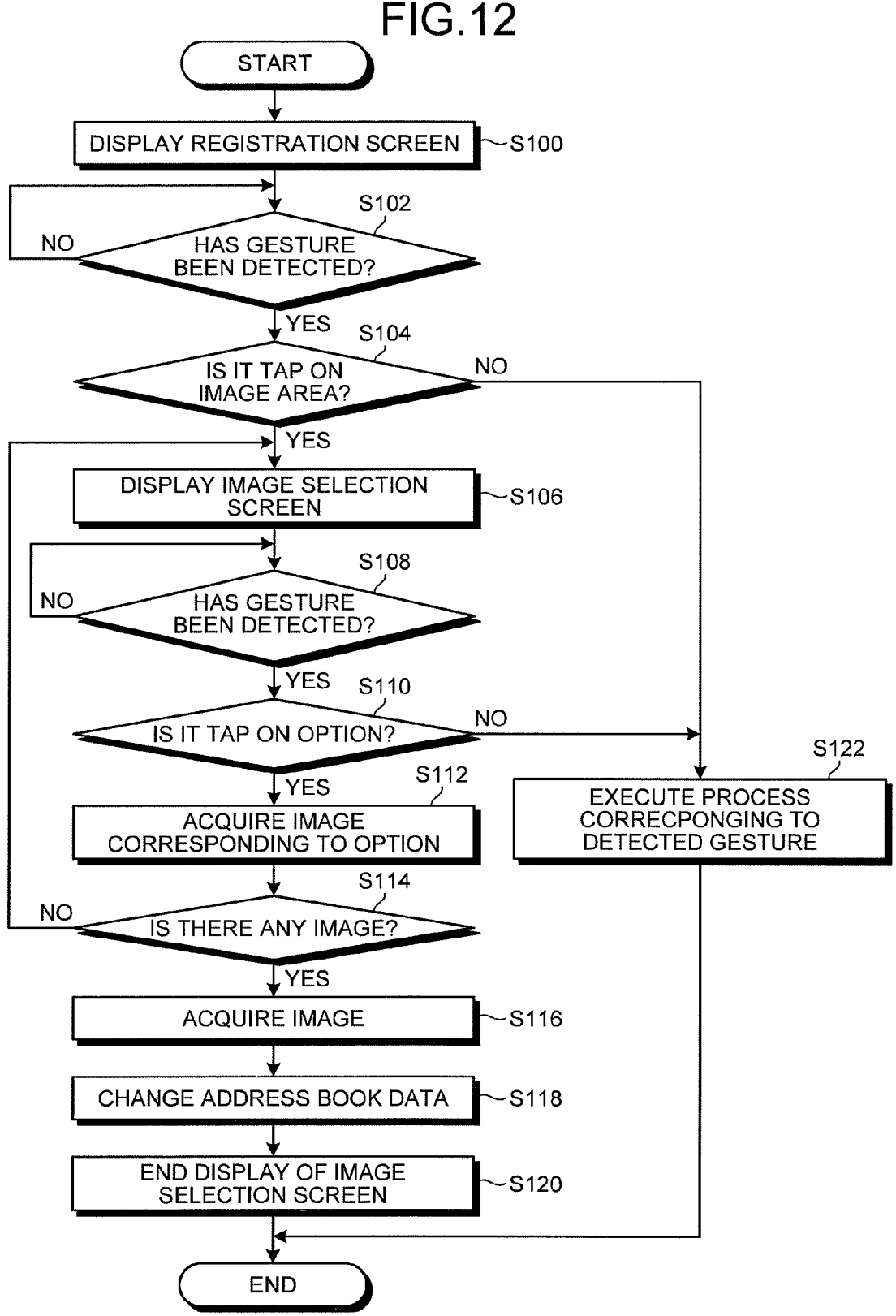
FIG. 12 is a flowchart of a procedure for selecting and changing a profile image.

An example of a procedure for control based on the functions provided by the control program 9A will be explained below with reference to FIG. 12. FIG. 12 depicts a procedure for control executed during the display of the registration screen 90. The procedure illustrated in FIG. 12 is implemented by the controller 10 executing the control program 9A and the address book application 9D. The procedure illustrated in FIG. 12 is executed during the display of the registration screen 90. The controller 10 may execute other procedure for controlling the registration screen 90 in parallel with the procedure illustrated in FIG. 12.

At Step S100, when detecting a predetermined user's gesture, the controller 10 displays the registration screen 90. The predetermined user's gesture is a gesture of executing the address book application 9D and tapping the image area 82a or the information display area 82b in the person list screen 80. The controller 10 displays the registration screen 90, then at Step S102, acquires a detection result of the touch screen 2B during the display of the registration screen 90, and determines whether a gesture has been detected based on the acquired detection result. When it is determined at Step S102 that the gesture has not been detected (No at Step S102), the controller 10 proceeds to Step S102. That is, the controller 10 repeats the process at Step S102 until a gesture is detected through the touch screen 2B.

When it is determined at Step S102 that the gesture has been detected (Yes at Step S102), then at Step 104, the controller 10 determines whether it is a tap on the image area 92a. When it is determined that the gesture detected at Step S102 is a tap on the image area 92a (Yes at Step S104), then at Step S106, the controller 10 displays the image selection screen 100. When it is determined at Step S104 that the gesture is not a tap on the image area 92a (No at Step S104), then at Step 122, the controller 10 executes the process corresponding to the detected gesture and ends the present process. The process corresponding to the detected gesture includes various processes, executed while the controller 10 is displaying the registration screen 90, such as an input process to the family-name input item 92b or to the given-name input item 92c on the registration screen 90.

After displaying the image selection screen 100, then at Step S108, the controller 10 acquires a detection result of the touch screen 2B during the display of the image selection screen 100, and determines whether a gesture has been detected based on the acquired detection result. When it is determined at Step S108 that the gesture has not been detected (No at Step S108), the controller 10 proceeds to Step S108. That is, the controller 10 repeats the process at Step S108 until a gesture is detected through the touch screen 2B.

When it is determined at Step S108 that the gesture has been detected (Yes at Step S108), then at Step 110, the controller 10 determines whether it is a tap on the option 102. When it is determined that the gesture detected at Step S108 is a tap on the option 102 (Yes at Step S110), then at Step S112, the controller 10 executes acquisition of an image corresponding to the option 102. In other words, when detecting a tap on the option 102a of "Camera", the controller 10 acquires a captured image as a profile image 9Wa of a person.

When detecting a tap on the option 102b of "Data folder", the controller 10 acquires an image included in the image data 9W as a profile image 9Wa of a person. When detecting a tap on the option 102 of any of the SNSs, the controller 10 acquires an image obtained through communication service of the SNS as a profile image 9Wa of a person. When detecting a tap on the option 102e of "Preset", the controller 10 acquires a blank image 9Wb. When it is determined at Step S110 that the gesture is not a tap on the option 102 (No at Step S110), then at Step S122, the controller 10 executes the process corresponding to the detected gesture and ends the present process. The process for the detected gesture includes various processes, executed while the controller 10 is displaying the image selection screen 100, such as a process for ending the display of the image selection screen 100.

When executing acquisition of an image, then at Step S114, the controller 10 determines whether there is any image that can be acquired as an execution result of the image acquisition. When it is determined at Step S114 that there is an image that can be acquired (Yes at Step S114), then at Step S116, the controller 10 acquires the image. When it is determined at Step S114 that there is no image that can be acquired (No at Step S114), the controller 10 proceeds to Step S106 and re-displays the image selection screen 100.

After acquiring the image, then at Step S118, the controller 10 registers the acquired image as the profile image 9Wa of the person displayed on the registration screen 90. That is, the controller 10 changes the address book data 9X to address book data 9X in which the person displayed on the registration screen 90 is associated with the acquired image. After the change of the address book data 9X, at Step S120, the controller 10 ends the display of the image selection screen 100 and ends the present process.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

In the embodiment, the smartphone has been explained as an example of the device provided with the touch screen display; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device, comprising:
a touch screen display; and
a controller for setting an image in individual information registered in address book data in an associated manner, wherein
the controller is configured to display, when a predetermined gesture for setting the image in the individual information is detected, an image selection screen that includes an option to acquire the image to be associated with the individual information through communication service registered in the individual information,
the touch screen display is configured to display a registration screen for registering the individual information in the address book data, the registration screen including an image area for displaying the image,
the image includes a profile image registered in the individual information and a blank image indicating a blank state, and
the controller is configured
to associate, when the profile image is registered in the individual information, the profile image with the individual information and display the profile image in the image area of the registration screen, and
to associate, when the profile image is not registered in the individual information, the blank image with the individual information and display the blank image in the image area of the registration screen.

2. The device according to claim 1, wherein
the controller is configured to display the image selection screen when a gesture performed on the image area of the registration screen is detected as the predetermined gesture.

3. The device according to claim 1, wherein,
when a home screen is displayed on the touch screen display,
the controller is configured to display the image in a predetermined area of the home screen.

4. A non-transitory storage medium storing therein a program for causing, when executed by a device including a touch screen display, the device to execute:
detecting a predetermined gesture for setting an image in individual information registered in address book data in an associated manner;
displaying, upon the detecting, an image selection screen that includes options to acquire the image to be associated with the individual information through communication service registered in the individual information;
displaying a registration screen for registering the individual information in the address book data, the registration screen including an image area for displaying the image, the image includes a profile image registered in the individual information and a blank image indicating a blank state;
associating, when the profile image is registered in the individual information, the profile image with the individual information and displaying the profile image in the image area of the registration screen; and
associating, when the profile image is not registered in the individual information, the blank image with the individual information and displaying the blank image in the image area of the registration screen.

5. A device, comprising:
a communication unit configured to acquire information through communication service;
a touch screen display configured to display a screen for setting an image in individual information registered in address book data; and
a controller configured to acquire, when a predetermined gesture is detected during display of the screen, an image to be associated with the individual information through communication service registered in the individual information, wherein the touch screen display is configured to display a registration screen for registering the individual information in the address book data, the registration screen including an image area for displaying the image, the image includes a profile image registered in the individual information and a blank image indicating a blank state, and the controller is configured to associate, when the profile image is registered in the individual information, the profile image with the individual information and display the profile image in the image area of the registration screen, and to associate, when the profile image is not registered in the individual information, the blank image with the individual information and display the blank image in the image area of the registration screen.

6. The non-transitory storage medium according to claim 4, wherein the program is further configured to cause, when executed by the device, the device to execute:

displaying the image selection screen when a gesture performed on the image area of the registration screen is detected as the predetermined gesture.

* * * * *